United States Patent [19]

Matthews

[11] Patent Number: 5,122,043
[45] Date of Patent: Jun. 16, 1992

[54] ELECTRIC PULSED POWER VACUUM PRESS

[76] Inventor: M. Dean Matthews, 14800 Vickery Ave., Saratoga, Calif. 95070

[21] Appl. No.: 622,854

[22] Filed: Dec. 6, 1990

[51] Int. Cl.⁵ .............................................. B29C 35/00
[52] U.S. Cl. .................... 425/77; 425/174.6; 425/405.1
[58] Field of Search ............ 425/74, 174, 174.6, 425/405.1, DIG. 13, DIG. 26, DIG. 110

[56] References Cited

U.S. PATENT DOCUMENTS

| | | | |
|---|---|---|---|
| 2,920,172 | 1/1960 | Stallard | 425/DIG. 13 |
| 2,941,241 | 6/1960 | Strong | |
| 2,941,242 | 6/1960 | Hall | |
| 2,941,243 | 6/1960 | Bundy | |
| 2,941,248 | 6/1960 | Hall | |
| 2,944,289 | 7/1960 | Hall | 425/77 |
| 3,137,896 | 6/1964 | Daniels | 425/77 |
| 3,350,743 | 11/1967 | Ishizuka | |
| 3,436,182 | 4/1969 | Ishizuka | |
| 3,488,153 | 1/1970 | Bundy | |
| 3,548,190 | 12/1970 | Sclar et al. | 425/77 |
| 4,097,208 | 6/1978 | Ishaizuka | 425/77 |
| 4,097,274 | 6/1978 | Bakul | 75/201 |
| 4,102,679 | 7/1978 | Arvela | 75/226 |
| 4,225,300 | 9/1980 | Latter | 425/77 |

FOREIGN PATENT DOCUMENTS 63-49411 3/1988 Japan ........................ 425/405.1

OTHER PUBLICATIONS

Metals Handboood, Ninth Edition Erhard Klar, pp. 501-519.
G. R. Gathers, J. W. Shaner, and R. L. Brier, Rev. Sci. Instrum., vol. 47, No. 4, Apr. 1976, pp. 471-479.

Primary Examiner—Jay H. Woo
Assistant Examiner—Scott Bushey

[57] ABSTRACT

An electric pulsed power vacuum press assembly for fast pulse heating of electrically conductive materials at high pressures is disclosed. The fast pulse capability is provided for by a current path (49) that is characterized by extremely low inductance and resistance. The low inductance of the press structure is achieved through the use of parallel plate (52), (56) and coaxial (64), (98) transmission line elements in the circuit. The use of a vacuum environment (46) reduces contamination of the material being processed. The press is useful for achieving fine scale adiabatic heating in dielectric/conductor mixtures (11) such as graphite and diamond, allowing for extreme heating of the conductive phase with minimal heat transfer to the dielectric phase during the heating pulse. Fine scale adiabatic heating enables phase changes and consolidation to be achieved in a composite with minimum energy input and minimum heating of the press structure.

10 Claims, 5 Drawing Sheets

ELECTRIC PULSED POWER VACUUM PRESS

TECHNICAL FIELD

This invention relates to the process of simultaneously applying heat and pressure to a material sample to achieve a phase change and/or densification of the sample. Specifically, the invention relates to improvements in a class of equipment used for hot pressing of materials. The relevant class of equipment includes equipment in which pressure is applied to a sample by mechanical force on an enclosed die assembly, and simultaneous heating is achieved by passing an electric current through the sample.

BACKGROUND ART

In the construction of hot pressing equipment there are compromises involving pressure and temperature capability, sample volume capacity, and the adjustment of pressure and temperature process parameters over time. Equipment designs are selected to maximize the resolution on those parameters which are not critical to the particular purpose, but no single design can be suitable to all purposes.

One major subclass of equipment is based on the work of Bridgman and is exemplified in commercial application by the seminal work at General Electric in the field of diamond synthesis. The inventions disclosed in U.S. Pat. Nos. 2,941,241, 2,941,242, 2,941,243, and 2,941,248 demonstrate equipment in which high pressures and temperatures are produced in a small volume. The load bearing components in these structures are constructed of metal alloys and tungsten carbide, with seal components being constructed of ceramic materials. This construction provides excellent pressure capability but has limited temperature and volume capability due to the low hot strength of the materials of construction. Similar equipment is demonstrated in U.S. Pat. Nos. 3,350,743 and 4,097,208.

A second subclass of equipment operates at lower pressures, with larger sample volumes and occasionally higher temperatures. In this subclass the materials of construction are based upon graphite. Cylindrical punch and die assemblies are commonly used as well as more complicated geometries, as shown in U.S. Pat. No. 4,102,679. A recent variation involving a quasi-isostatic pressure technique is shown in U.S. Pat. No. 4,853,178.

In addition to the steady-state capability for holding a given combination of pressure and temperature, U.S. Pat. No. No. 3,488,153 teaches the desirability of rapid heating by capacitive discharge. In addition U.S. Pat. No. 4,097,274 teaches that the capability for rapid heating and short dwell time at peak temperature is desirable (e.g. in the manufacture of polycrystalline diamond articles).

An overview of hot pressing in general with a section pertinent to direct resistance heating is presented in the *ASM Metals Handbook, Ninth Edition* (volume 7, Powder Metallurgy).

A salient feature of the current state of the art is the limitation of power input to the sample and the resultant limitation on heating rates. Power input densities are typically less than $10^6$ watts/cm$^3$ and heating rates are less than 200 degrees C./sec except for capacitive discharge systems.

There is an inherent disadvantage with low input power densities in that power dissipated in the sample is lost to the surrounding press structure before the peak process temperature is reached. This results in decreased efficiency, longer heating times and additional thermal loading of the press structure.

Hot pressing as currently practiced is carried out at or near conditions of thermal equilibrium. Indeed, the *ASM Metals Handbook, Ninth Edition* teaches that in order to achieve acceptable results, a hot pressing system must allow thermal equilibrium conditions (volume 7, Powder Metallurgy, p. 503). Aside from the heating and cooling segments of the process cycle, there is typically a prescribed process dwell temperature that is held for a period of time lasting from a few seconds to several hours. The direct resistance heated process in particular tends to minimize temperature gradients within the sample since heating occurs throughout the volume of the sample. Even for mixtures of dielectric and electrically conductive materials in which only one component is being directly heated, the gradients are generally small due to the slow heating rates and the short thermal path into the dielectric phase. Once the process reaches its dwell temperature, thermal equilibrium between the phases is quickly established.

The prior art methods cited above note the desirability of power efficiency, rapid heating capability and high temperature capability but do not effectively achieve such. The means by which these goals are pursued are presented in the context of material resistances, applied voltages and the resultant currents and power dissipations. This is a limited approach. A comprehensive design of a direct resistance heated hot pressing process must include a complete electrical design that addresses not only the resistive nature of the press structure and sample, but the capacitive and inductive elements as well. Full consideration must be given to the power supply and hot press structure as an electrical system if the performance is to be optimized with respect to rapid heating, power efficiency and peak temperature capability. Although rapid heating has been shown to be desirable, and capacitive discharge has been demonstrated as a viable means of achieving rapid heating, capacitor banks are often attached to equipment that was designed for steady state operation, as in U.S. Pat. No. 3,488,153. Accordingly, the prior art has not been successful in developing high speed, low inductance heated press structures, and substantial room for improvement remains in these areas.

DISCLOSURE OF THE INVENTION

It is therefore an object of the present invention to provide a complete design of the press structure and power supply which results in extremely fast heating capability in a high pressure press, and minimizes the unique contamination problems facing rapid thermal processing.

It is another object of the present invention to provide improved performance equipment for use in the process of direct resistance heated hot pressing which has the capability for heating a sample under high pressure in a controlled atmosphere by an intense electrical pulse of extremely short duration.

It is yet another object of the present invention to provide a press insert member including an electrical pathway which is characterized by very low inductance and resistance.

It is a further object of the present invention to facilitate the application of high mechanical pressures to a sample without degrading the electrical characteristics of the current pathway.

It is still another object of the present invention to minimize contamination of a sample by evacuating the surrounding chamber, before and during the high pressure heating process.

Briefly, a preferred embodiment of the present invention is a high pressure electric pulsed vacuum press including a hydraulic press component, a press insert member adapted to enclose a selected sample, a power supply assembly (preferably a low inductance capacitor bank) for providing electrical energy for rapid heating and a vacuum assembly for evacuating the vicinity of the sample to aid in the prevention of contamination, and a low current power supply for heating to assist in outgassing the sample.

The hydraulic press component is of conventional construction, as is the power supply assembly, though care must be taken to select power supply components capable of delivering very high voltage (approximately 5,000 to 50,000 volts) in short duration pulses (less than 0.001 seconds, and preferably less than 0.00002 seconds). The vacuum assembly is also of conventional construction and is selected to provide pressures of approximately $10^{-6}$ torr to the sample structure.

The preferred insert member is of unique construction adapted to provide a superior electrical flow pathway from the power supply through the sample, with the pathway having the capability of delivering the high voltage pulses to the sample while having minimum inductive and internal resistance characteristics.

The press insert member includes a static subassembly having a pair of plate conductors separated by a plate dielectric to provide the outgoing and return current paths for the electrical heating pulses generated by the power supply. The first, or outgoing, plate conductor is electrically connected to a center conductor which also acts as a pressure piston, with the electrical connection being over a relatively large planar area in order to maximize conductance. A separate die bore piston abuts against the center conductor/piston to deliver both mechanical force and electrical pulses to the sample chamber.

The present insert member further includes a dynamic subassembly which moves with respect to the static subassembly and creates the physical pressure. A portion of the electrical path lies through the dynamic subassembly and forms a portion of the return path to the static subassembly and back to the power supply. A dynamic subassembly includes a dynamic backing plate and die assembly components. The dynamic subassembly is connected to the static subassembly with a bellows type connection such that the electrical current may be carried to a lower conductor member.

The present invention also includes an alternate embodiment in the nature of a Bridgman anvil. This structure, which is in the form of a press insert member somewhat similar to that used in the preferred embodiment, is utilized for even higher mechanical pressures and may be utilized for extreme conditions such as pressures in excess of three million psi. Like the preferred embodiment, the alternate embodiment is characterized by low inductance construction.

An advantage of the present invention is that it achieves an extremely good ratio of maximum temperature to power usage.

Another advantage of the present invention is that it achieves extremely high sample temperatures by utilizing nonequilibrium type heating.

Still another advantage of the present invention is that, when utilized with mixtures of conductive and dielectric powders, the rapid heating may allow for melting of the conductive phase with minimal heat transfer to the dielectric phase.

A further advantage of the present invention is that it may be utilized under vacuum conditions, thus preventing contamination.

These and other objects and advantages of the present invention will become clear to those skilled in the art upon a review of the following description, the accompanying drawings and the appended claims.

BEST MODE FOR CARRYING OUT THE INVENTION

Figure 1:
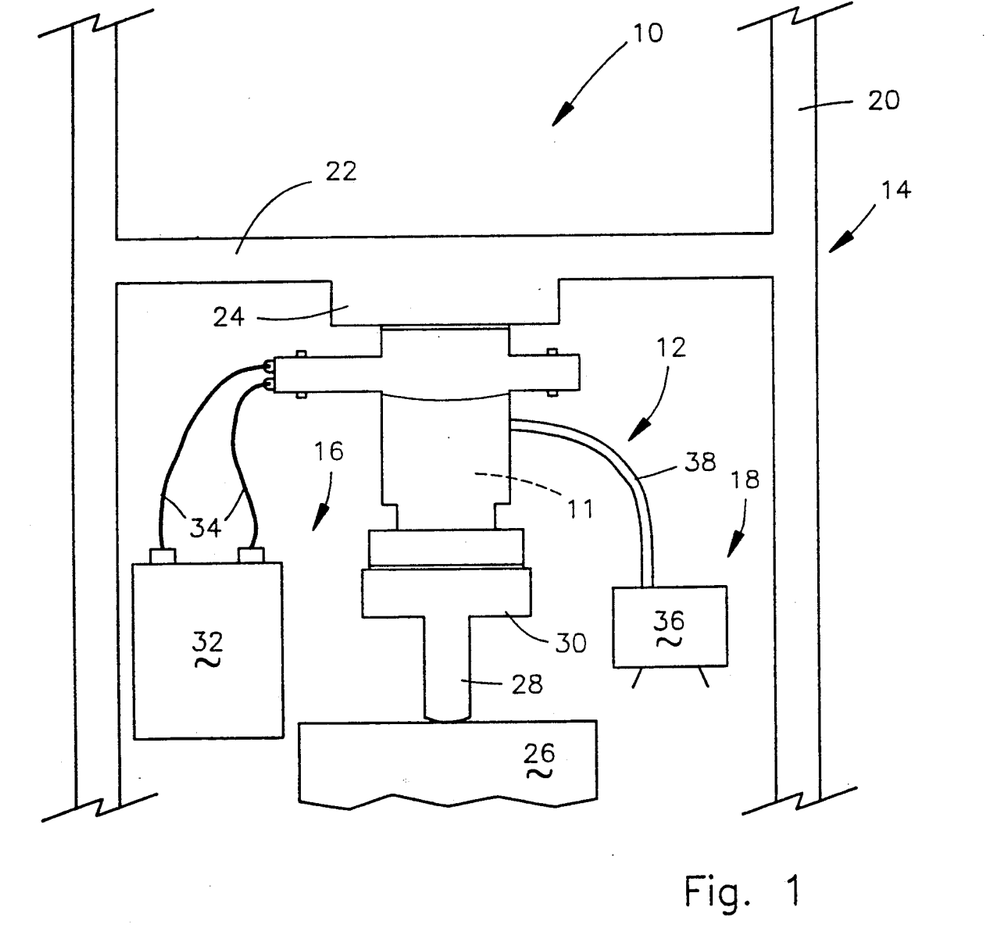
FIG. 1 is a front view of an electric pulsed power vacuum press according to the preferred embodiment.

The preferred embodiment of the present invention is an electric pulsed power vacuum press which is illustrated in a rough representational fashion in FIG. 1 and is designated by the general reference character 10. The electric pulse power vacuum press 10 is adapted for utilization in applying extremely high temperature and pressure condition to a desired sample 11 (see FIG. 2). The preferred embodiment 10 is primarily adapted for usage in material research and testing and in preparing certain materials which require high temperature and pressure formation conditions.

The preferred embodiment 10 includes a press insert member assembly 12, a hydraulic press assembly 14 and a vacuum assembly 18. Of these assemblies, the hydraulic press assembly 14, the power supply assembly 16, and the vacuum assembly 18 are generally conventional in nature and are described herein in less detail. However, the press insert assembly 12, illustrated in FIGS. 2 through 5, particularly, is unique and has features and characteristics not found in conventional structures. The power supply assembly may either be conventional in nature, as illustrated in FIG. 1 or of specialized construction, as in FIG. 3.

The hydraulic press 14 includes a vertical press frame 20 having a cross member 22 situated above, in the standard orientation, the press insert assembly 12. A buttress plate 24 is provided on the cross member 22 to provide a stationary plate against which the press insert 12 is supported while hydraulic pressure is applied thereto by a hydraulic jack member 26 (hydraulic ram) situated beneath the press insert assembly 12. The hydraulic jack member 26 drives a hydraulic ram 28 having a ram plate 30 preformed thereon. The ram plate 30 contacts the press insert assembly 12 so as to force the press insert assembly 12 against the buttress plate 24 and thus create high mechanical pressure on the press insert assembly 12. Both the ram plate 30 and the buttress plate 24 should be dielectric in nature or provided with dielectric insulation such that there is no electrical energy transfer to the hydraulic press 14 from the press insert 12.

The pulse power supply assembly 16 shown in FIG. 1 includes a power supply unit 32 which delivers pulsed electrical power to the press insert assembly 12 through bus conductors 34. The preferred power supply 32 is a capacitor bank of low inductance design or a homopolar generator. Capacitor banks are capable of providing pulses of up to a few megajoules with durations of a millisecond or less. Homopolar generators such as the one demonstrated in U.S. Pat. No. 4,816,709 are capable of delivering tens of megajoules in a pulse of one second duration or less. Homopolar generators have been used by Weldon and Aanstoos for consolidation of powders (Journal of Mechanical Working Technology, 20(1989 pp 353-363). Although homopolar generators have a large energy storage capacity, they are unsuitable for fast pulse systems due to their large effective inductance and capacitance. Pulse forming networks can be used to improve the time response of homopolar generators albeit with a penalty in complexity and efficiency. The nature and characteristics of an appropriate type of power supply 32 and an alternative to the bus conductor 34 shown is more thoroughly described hereinafter with respect to FIG. 3.

The vacuum assembly 18, includes, in a position situated exterior to the press insert assembly 12, a conventional vacuum pump 36 which is connected via vacuum tubing 38 to the press insert assembly 12.

Figure 2:
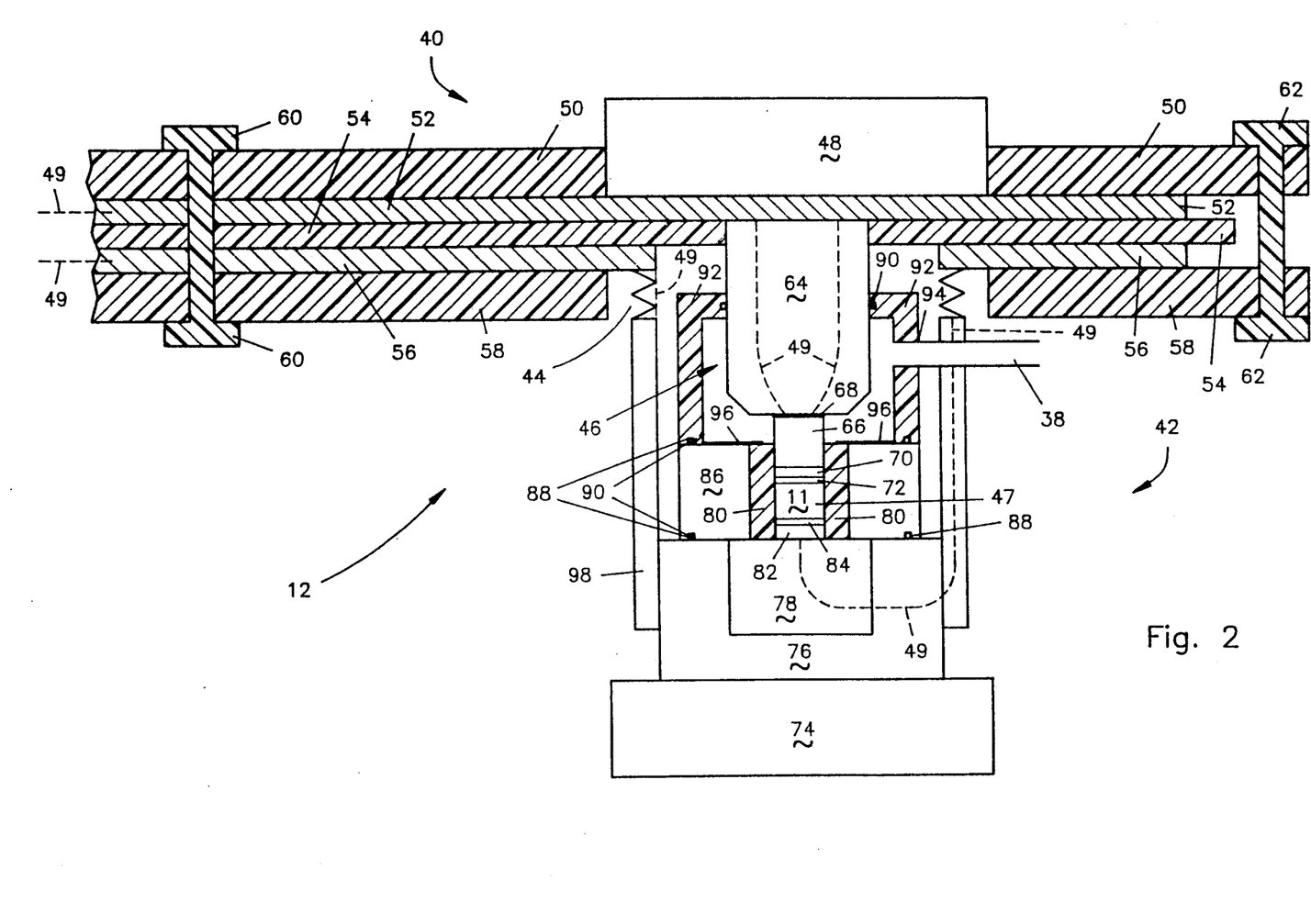
FIG. 2 is a cross-sectional view of a press insert member of the preferred embodiment.

The preferred embodiment of the press insert assembly 12 is illustrated in a cross-sectional view in FIG. 2. In this illustration it may be seen that the press insert assembly 12 is formed of a plurality of subassemblies, each of which operates with the others to serve a specific purpose in the overall electric pulsed power vacuum press 10 The press insert assembly 12, shown in FIG. 2, provides the structure which encloses the sample 11.

It may be seen in FIG. 2 that the press insert 12 includes a static subassembly 40 which is adapted to remain static against the buttress plate 24 and a dynamic subassembly 42 which will be moved with respect to the static subassembly 40 by the action of the hydraulic piston 28. The static subassembly 40 and the dynamic subassembly 42 are joined together by a dynamic coupling 44 which, with the associated subassemblies, defines a vacuum chamber 46 in the interior of the press insert member 12. The vacuum chamber 46 is connected to the vacuum tubing 38 such that the vacuum chamber 46 may be evacuated to prevent chemical contamination of the sample 11 during processing. The central portion of the vacuum chamber 46, wherein the sample 11 is actually situated, is referred to as the sample chamber 47.

The static assembly 40 includes a generally circular central static backing plate 48 which is adapted to abut against the buttress plate 24. The static backing plate 48 provides mechanical support and reduces pressure on the upper load bearing surfaces of the structure. The static backing plate 48 is preferably constructed of hardened tool steel or high carbon steel.

The electrical pulse which provides energy to heat the sample 11 is delivered to the sample 11 in a conducting pathway 49 within the press insert member 12. The portion of the electrical conducting pathway 49 which is situated in the static assembly 40 is contained in a layered structure including a first clamp plate 50, a first plate conductor 52, a plate dielectric 54, a second plate conductor 56 and a second clamp plate 58, all held in a parallel layered juxtaposition by a first clamp bolt 60 and a second clamp bolt 62, as shown. The structure (containing the conducting pathway 49) is a broad planar structure such that an extremely broad (and, consequently, low inductance and low resistance) electrical pathway is provided within the press insert assembly 12. This acts to minimize inductance and resistance in the electrical structure.

The upper clamp plate 50 and the lower clamp plate 58 provide mechanical support for a parallel plate transmission line structure formed by the first plate conductor 52, the plate dielectric 54 and the second plate conductor 56. The clamp plates 50 and 58 act to restrict the movement of the parallel plate transmission line components and to prevent physical displacement caused by the large mechanical forces that may be generated between the conductive components by the high current pulses which may be delivered thereto from the pulse power supply 32. If movement between the plate conductors 52 and 56 is not restricted by the clamp plates 50 and 58, damage to the conductive components can result, or insufficient energy to the sample 11 may be caused by warping or deformation. For this reason, the preferred materials for the first clamp plate 50 and the second clamp plate 58 are rigid dielectric material such as glass/epoxy composites. Of course, it is extremely desirable that the clamp plates 50 and 58 be dielectric material.

The first plate conductor 52 and the second plate conductor 56 are adapted to constitute a portion of the electrical pathway 49 having extremely low resistance and minimum inductance. For this reason, the plate conductors 52 and 56 are selected to be broad planar structures of low electric resistivity materials. However, it is also necessary to choose a material having reasonable mechanical strength such that it does not deform under heavy load. The preferred materials are aluminum, brass, copper or beryllium copper.

The plate dielectric 54 is utilized to separate the first plate conductor 52 from the second plate conductor 56 in such a manner that electrical discharge between the plate conductors 52 and 56 is prevented. The plate dielectric 54 is selected to have a high dielectric strength such that it will withstand the operating voltage of the pulse source from the power supply 32 and is also selected to be very thin so as to minimize transmission line inductance. The plate dielectric 54 may be single-layer or multilayer. The preferred materials for the plate dielectric 54 are polyester film, fluorocarbon and polyamide.

The first clamp bolt 60 and the second clamp bolt 62 are utilized to maintain the electrical path structure in the layered juxtaposition. The clamp bolts 60 and 62 are selected to be electrically insulated and also to have good tensile strength. The preferred materials for the clamp bolts 60 and 62 are nylon or acetal for solid bolts or, vinyl or fluorocarbon-sheathed steel for composite bolts.

The static subassembly 40 further includes mechanical components adapted to deliver pressure to the sample 11, the most notable of these components, which also serve to deliver electrical energy to the sample 11, is a piston/center conductor 64. The piston/center conductor 64 is a low electrical resistance and high compressive strength component, preferably formed of tungsten carbide with three to six percent cobalt binder. The piston/center conductor 64 transmits the mechanical force between the static backing plate 48 and the sample 11 and also forms a portion of the electrical pathway 49 in that it is directly electrically connected to the first plate conductor 52. The connection between the first plate conductor 52 and the piston/center conductor 64 is accomplished by soldering or brazing with the solder or braze alloy being selected to provide very low electrical resistance and a compressive strength greater than the joint pressure which may occur under severe mechanical loading. As may be seen from FIG. 2, the portion of the first plate conductor 52 which is situated between the static backing plate 48 and the piston/center conductor 64 must be able to resist high compressive pressure without substantial deformation. Otherwise, the press insert assembly 12 would not be useful more than a few applications since the upper plate conductor 52 would be deformed beyond usefulness.

A die bore piston 66 is situated intermediate the piston/center conductor 64 and the sample chamber 47. A piston shim 68 is situated intermediate the die bore piston 66 and piston/center conductor 64 to act as a cushion. The piston shim 68 is ductile at high pressures and has a low electrical resistance. Copper is the preferred material for the piston shim 68.

The die bore piston 66 acts to transmit both mechanical force and the pulse current from the piston/center conductor 64 to the sample chamber 47. The die bore piston 66 is of substantially smaller diameter than the piston/center conductor 64 and thus acts to concentrate mechanical force. The die bore piston 66 must have both low electrical resistance and high compressive strength. The preferred material, like that of the piston/center conductor 64 is tungsten carbide with three to six percent cobalt. In some instances it may be desirable to plate the die bore piston 66 with a layer of copper or silver in order to enhance electrical performance and also to provide a degree of lubricity to minimize sliding friction with the dynamic subassembly 42 at high pressure conditions.

The interface between the die bore piston 66 and the sample 11 is provided by a top die bore seal 70 and a first sample spacer 72. The top die bore seal 70 both transmits the force load and the current pulse between the die bore piston 66 and the sample 11. The top die bore seal 70 must be ductile and have excellent electrical conductivity and thermal capacitance. The die bore seal 70 must be adapted to deform under pressure so as to provide an appropriate seal for the sample chamber 47. The die bore seal 70 also acts as a thermal capacitor to reduce the potential thermal loading of the die bore piston 66, and to deliver the electrical energy to the sample chamber 47.

The first sample spacer 72 is a disk of material in the sample chamber 47 which is utilized to transmit both the force load and the current pulse. The first sample spacer 72 is selected to have a high melting point, low electrical resistance, low thermal conductivity and high thermal capacitance. It is also desirable that the sample spacer 72 be selected to have a minimum potential reaction with either the sample 11 or the surrounding materials under high temperature and pressure conditions. The preferred material for the first sample spacer 72 are tungsten, graphite, molybdenum and tantalum. To improve thermal capacitance, the spacer 72 may be a composite of the above materials and a lower melting point material with a high latent heat of fusion. A specific structure could be tungsten and copper.

The action of the press insert member 12 upon the sample 11 is accomplished by the interaction of the static subassembly 40 with the dynamic subassembly 42. The dynamic subassembly 42 is defined as that portion of the press insert member 12 which is capable or relative motion with respect to the static subassembly 40. The dynamic subassembly 42 is adapted to be forced against the static subassembly 40 by the hydraulic ram 28 of the hydraulic press 14. The dynamic subassembly 42 also provides the return portion of the conducting pathway 49 for the electrical energy delivered through the first plate conductor 52, the piston/center conductor 64 and the die bore piston 66 through the sample 11. For this reason, the dynamic subassembly 42 must be electrically connected to the static subassembly 40, and particularly the second plate conductor 56. This is accomplished by way of the dynamic coupling 44. In the preferred embodiment, the dynamic coupling 44 is in the form of a bellows connector formed of a low resistivity material such as copper or beryllium copper.

The dynamic subassembly 42 includes a dynamic backing plate 74, similar in function to the static backing plate 48. The dynamic backing plate 74 abuts against the ram plate 30 and transmits the mechanical force between the hydraulic ram 28 and the sample 11. The dynamic backing plate 74 is of a material similar to that of the static backing plate 48 and has dimensions sufficient to reduce the mechanical pressure at the interface between the dynamic backing plate 74 and the ram plate 30 of the hydraulic press 14.

Moving inward from the dynamic backing plate 74 toward the sample 11, the next component is a die member base 76. The die member base 76 transmits mechanical force from the dynamic backing plate 74 to a base insert 78. The die member base 76 transmits both mechanical force between the dynamic backing plate 74 and the base insert 78 as well as forming a portion of the electrical pathway 49 for the pulse current. Consequently the die member base 76 should have good electrical and thermal conductivity and good mechanical strength. The preferred materials are brass, copper and beryllium copper.

The base insert 78, which is adapted to nest within the die member base 76, is utilized to transmit both mechanical force and electric current. The base insert 78 is selected to have a high degree of hardness and compessive strength as well as very high electrical and thermal conductivity. The base insert 78 serves a purpose of being a primary heat sink which permits dissipation of the heat generated in the sample chamber 47. The preferred material for the base insert 78 is the same as that of the die bore piston 66 and the piston/center conductor 64, that is, tungsten carbide with three to six percent cobalt binder.

A die bore insulator 80 is adapted to abut against the inner surface of the base insert 78. The die bore insulator 80 is a ring member which radially defines the sample chamber 47. The die bore insulator so is adapted to provide electrical insulation and low thermal conductivity. The die bore insulator 80 is selected to have very high strength to resist the pressures and temperatures which are developed in the sample chamber 47 and also to have a very high melting point. The preferred material for the die bore insulator 80 is a refractory ceramic such as aluminum oxide, magnesium oxide, zirconium oxide, boron nitride or high resistivity silicon carbide, or a combination thereof. The material of die bore insulator 80 is also selected to provide for good sliding capability with respect to the die bore piston 66.

A bottom die bore seal 82 and a second sample spacer 84 are adapted to fit within the die bore insulator 80 and against the base insert 78. The bottom die bore seal 82 and the second sample spacer 84 are similar in structure and properties to the corresponding top die bore seal 70 and the first sample spacer 72, which are also enclosed within the die bore insulator 80.

A compression ring 86 is formed to circumferentially enclose the die bore insulator 80. The compression ring 86 is adapted to act both as a compression element for the die bore insulator 80 and also as a heat sink element. During the assembly of the press insert member 12 the die bore insulator 80 is placed in a state of compression during the installation within the compression ring 86. This preloaded compression condition enhances the strength of the die bore insulator 80. The compression ring 86 is selected to have good tensile strength, a high coefficient of thermal expansion and good thermal conductivity. Balancing and trade offs among these parameters may be made in order to achieve the best result for specific process conditions. However, the preferred materials are copper alloys and high strength iron alloys with low magnetic permeability.

The compression ring 86 is provided with a circumferential seal ring detent 88 at a location where the compression ring 86 abuts against the die member base 76. The seal ring detent 88 is adapted to partially enclose an O-ring 90 which provides a seal between the compression ring 86 and the die member base 76, thus maintaining the integrity of the vacuum chamber 46.

A vacuum cap 92 is adapted to rest atop the compression ring 86. The vacuum cap 92 also is adapted to provide a sliding seal against the side of the piston/center conductor 64. The vacuum cap 92 defines the outside of the vacuum chamber 46. A vacuum aperture 94 formed in the vacuum cap 92 connects to the vacuum tubing 28 so as to provide a mechanism for evacuating the vacuum chamber 46. The vacuum cap 92 is provided with further seal ring detents 88 both along the edge surface which abuts against the compression ring 86 and the edge surface which abuts against the piston/center conductor 64. Additional O-rings 90 are provided in each of the seal ring detents 88 to provide a sliding vacuum seal between the components. The vacuum cap 92 is formed of a dielectric material such as acetal so as to prevent electrical conduction from the compression ring 86 to the piston/center conductor 64, except through the sample chamber 47. The sliding seal capability of the vacuum cap 92 also provides that the interior volume of the vacuum chamber 46 may vary with the motion of the dynamic subassembly 42 relative to the static subassembly 40 since the piston/center conductor 64 may intrude into the vacuum chamber 46 to a greater or lesser degree depending on the position of the dynamic subassembly 42. The sliding seal between the O-ring 90 and the piston/center conductor 64 provides this capability.

A chamber insulator 96 is provided within the vacuum chamber 46 to prevent electrical discharge directly from the piston/center conductor 64 to the conductive compression ring 86. The chamber insulator is a dielectric disk which is adapted to rest on the surface of the compression ring 86 and a portion of the surface of the die bore insulator 80. The chamber insulator 96 provides electrical insulation which prevents a short circuit between the piston/center conductor 64 and the compression ring 86 which can occur by breakdown of the chamber atmosphere at low pressure and high voltage. The preferred material of the chamber insulator 96 is mylar. Alternatively, it is possible to provide the chamber insulator 96 as a coating to the compression ring 86. If the chamber insulator 96 is in the form of a coating it may be applied as acrylic, urethane or epoxy on the upper surface of the compression ring 86. The chamber insulator 96 is adapted to be held in position by the interior surface of he vacuum cap 92 and may also be attached to the compression ring 86, if desired.

The final component of the dynamic subassembly 42 is a coaxial conductor 98 which forms the component of the return electrical pathway 49 from the sample chamber 47 to the static subassembly 40. The coaxial conductor 98 is a rigid low electrical resistivity body that is attached via the dynamic coupling 44 to the second plate conductor 56. The coaxial conductor 98 is also attached to the die member base 76 by mechanical attachment means such as screws or a clamp. The coaxial conductor 98, preferably constructed of copper or beryllium copper, provides a low resistivity current pathway 49 from the die member base 76, and consequently the die insert 78 and the sample 11, to the second plate conductor 56, thus completing the entire current pathway 49 through the press insert member 12 to the power supply 32.

Figure 3:
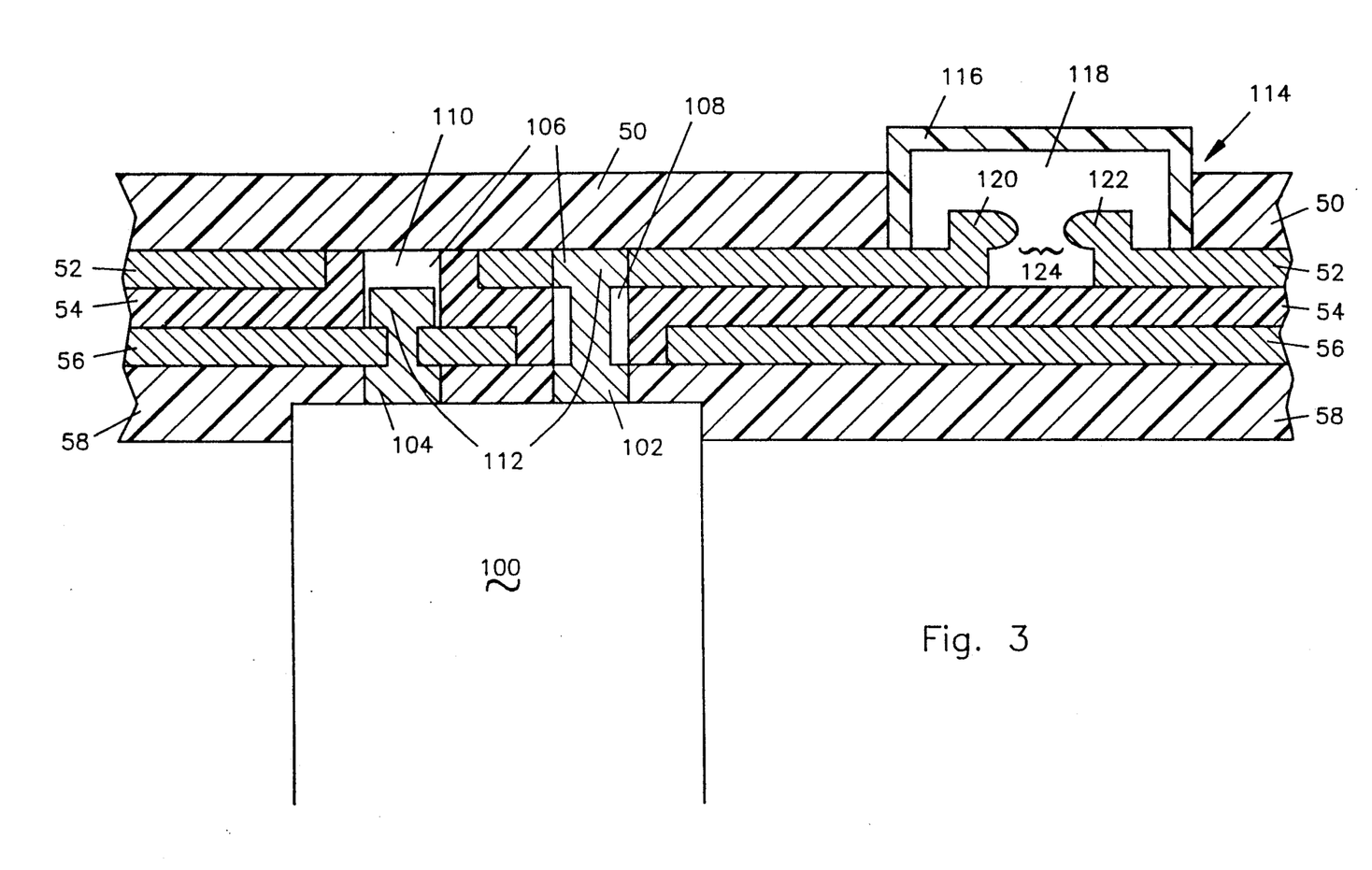
FIG. 3 is a cross-sectional view of portion of a parallel plate transmission line structure.

Referring now to FIG. 3, a cross-sectional view of the portion of the static subassembly 40 is illustrated in order to show one manner in which the electrical power may be delivered to the electrical pathway 49 in a manner which results in minimum inductance and maximum power transmission. In the illustration of FIG. 3, a low inductance capacitor 100 acts as the power source. Although only a single capacitor 100 is illustrated in the drawing, the preferred embodiment 10 may actually use a large bank of capacitors to generate the total desired voltage and current. However, for the purposes of discussion, a single capacitor is adequate to illustrate the connection structure.

The low inductance capacitor 100 is shown to have a positive terminal 102 and a negative terminal 104. The terminals 102 and 104 are adapted to fit within a pair of terminal receiving detents 106 formed in the Static subassembly 40 at a position removed from the mechanically stressed portions of the press insert member 12. It is noted that the terminal receiving detents 106 are circular in nature and only act as holes within the planar structure. That is, the conductance of the first plate conductor 52 and the second plate conductor 56 is not substantially affected by the terminal receiving detent 106, as the remainder of the planar structure is intact, thus allowing current to bypass the terminal receiving detent 106.

As illustrated, the terminal receiving detents 106 include a positive terminal detent 108 and a negative terminal detent 110. The positive terminal 102 is adapted to fit within the positive terminal detent 108 and the negative terminal 104 is adapted to fit within the negative terminal detent 110. Although the terms "positive" and "negative" are utilized herein for the purposes of discussion, it is understood that reversing the polarity of the structure could just as easily be constructed with a reversed polarity without adversely affecting the performance of the components.

The structure of the elements surrounding the positive terminal detent 108 and the negative terminal detent 110 are different in that they allow the electrical connection of the appropriate terminal with the appropriate conductive plate within the static subassembly 40. That is, the plate dielectric 54 is deformed in the vicinity of positive terminal detent 108 in such a manner as to prevent contact of the second plate conductor 56 with the positive terminal 102. Similarity, the plate dielectric 54 is deformed at the negative terminal detent 110 in such a manner as to prevent contact and/or arcing between the first plate conductor 52 and the negative terminal 104. On the other hand, the structure of the static subassembly 40 in the vicinity of the positive and negative terminal detents 108 and 110 is such to permit a good broadbased connection between the positive terminal 102 and the first conductive plate 52 and, conversely, the negative terminal 104 with the second conductor plate 56. One or more terminal connector elements 112 may be provided in association with each of the terminals in order to secure the capacitor 100 in place within the terminal receiving detent 106.

A method for initiating the pulse power by closing the electrical conductive pathway 49 is also shown in FIG. 3. The method for closing the pathway 49 is illustrated as being a rail gap switch 114. The rail gap switch 114 is a very low inductance type of switch which is especially well adapted for delivering very high current pulses in very short time intervals, and may be triggered by a variety of means, including light sources and high voltage sparks. The rail gap switch 114 includes an enclosing switch housing 116 which captures a pressurized ($\geq 1$ atmosphere) dielectric gas 118 therewithin. The switch 114 also includes appropriate deformation of linear segments of the first plate conductor 52 to form a first elongated electrode 120 and a second elongated electrode 122, separated by a linear gap 124. The first electrode 120 and the second electrode 122 are essentially in the form of elongated rails having the linear gap 124 separating them, thus explaining the name. When appropriate triggering conditions are met, such as ultraviolet triggering, or spark triggering, which alters the dielectric nature of the gas 118, the electrical forces will cause the current to arc across the linear gap 24 and result in a rapid completion of the conductive pathway 49 between the first electrode 120 and the second electrode 124. Since the first electrode 120 is directly connected to the positive terminal 102 of the low inductance capacitor 100, and the second electrode 124 is connected, via the conductive pathway 49 extending through the sample 11, to the negative electrode 104, activation of the rail gap switch 114 will complete the pathway 49 and cause the pulse current to flow through the sample 11, thus causing a high degree of electrical heating of the sample 11.

Figure 4:
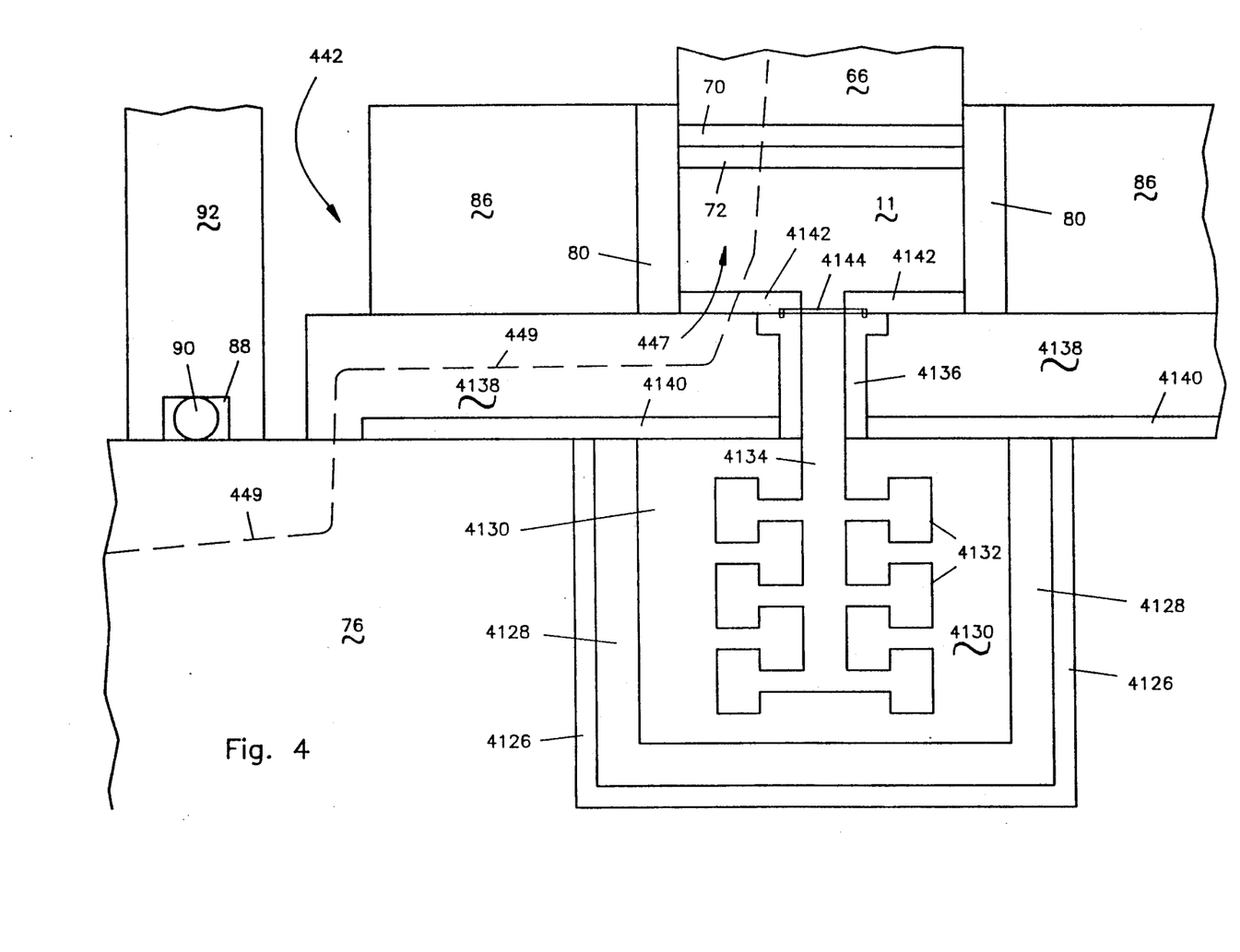
FIG. 4 is a cross-sectional view of an alternate embodiment of the dynamic assembly portion of the press insert.

In the preferred embodiment of the press insert member 112 illustrated in FIG. 2, the sample 11 was adapted to be contained within the sample chamber 47 during the entire process. However, it may be desirable to utilize the electrical pulse power vacuum press 10 to create a molten or fluid form of the sample 11 and to mold that sample into a prescribed shape. FIG. 4 therefore illustrates an alternative dynamic subassembly 442 corresponding to the dynamic subassembly 42 of the FIG. 2 but altered in order to facilitate the handling of fluid samples.

The majority of the components of the alternate dynamic subassembly 442 are unaltered from those of the preferred dynamic subassembly 42. Those components which are unaltered are designated by the same reference numerals in FIG. 4 as in FIG. 2. Those elements in which have an analogous, but different, elements in FIG. 2 are designated by the same reference number plus 400. Those elements having no corresponding analog in FIG. 2 continue in the numbering sequence but are proceeded by the digit "4".

The die member base 76, also referred to as a mold base 76, is identical to that shown in FIG. 2, however, the base insert 78 of FIG. 2 is replaced by components adapted to mold a molten sample which is created during the heating process. As in FIG. 2, the components are shown in cross-sectional and are considered to be radially symmetrical to a great degree.

A mold thermal insulator 4126 is placed within the cavity formed in the mold base 76 and encloses a heating shell 4128 which, in turns, encloses an injection mold 4130. The mold thermal insulator 4126 is selected to have low thermal conductivity and moderate compressive strength since it must bear the load of the mechanical pressure. It is also selected to have low electrical conductance in order to electrically isolate the heating shell 4128 from the conducting path 49.

The heating shell 4128 is utilized to provide heating to the injection mold 4130 and to control the cooling rate of the sample 11 within the injection mold 4130. The heating shell 4128 is constructed of resistance heating elements that are electrically isolated from the rest of the structure. Not shown are the connections from the heating shell 4128 to external power sources which provide controllable heating to the heating shell 4128.

The injection mold 4130 is adapted to receive molten sample 11 within a mold pattern 4132. The mold pattern 4132 is in a form of passages and detents in which the molten sample 11 can flow and cool. The pattern shown in FIG. 4 is arbitrarily selected for reference purposes only and is not intended as limiting. The injection mold 4130 is selected to have moderate high temperature strength and very low reactivity with the selected sample 11. Preferred materials are graphite, boron nitride, aluminum nitride and zirconia and magnesia.

The center of the mold pattern 4132 includes a sample flow channel 4134 which extends from the injection mold 4130 to the sample chamber 447. Intermediate the injection mode 4130 and the sample chamber 447 the sample flow channel 4134 is contained within a sample transfer tube 4136. The sample transfer tube 36 serves as a conduit for the sample material 11 between the sample chamber 447 and the injection mold 4130 and is selected to be nonreactive with the sample material 11. It is also important that the sample transfer tube 4136 be a good thermal insulator. Accordingly, the preferred materials are pyrolytic or highly oriented graphite or composites of both pyrolytic and oriented graphite.

In order to radially surround the sample transfer tube 4136 and to provide mechanical pressure and electrical current transfer between the mold base 76 and the sample chamber 47, a chamber base 4138 and a base insulator 4140 are provided. The chamber base 4138 is selected to be a good electrical conductor and to have good mechanical strength. Since part of the purpose of the chamber base 4138 is to act as a heat sink, it is also sometimes desirable to provide the chamber base 4138 with water cooling through flexible couplings or the like. The preferred materials for the chamber base 4138 are nickel plated beryllium copper or tungsten copper. The chamber base 4138 also provides a completion of the conductive pathway 49 from the sample chamber 447 to the mold base 76 and from there back to the static subassembly 40.

A portion of the chamber base 4138 which would otherwise abut against the injection mold 4130, the heating shell 4128, and the mold thermal insulator 4126 is prevented from so doing by the base insulator 4140. The base insulator 4140 retards both heat transfer from the injection mold 4130 to the chamber base 4138 and electrical transfer from the chamber base 4138 to the heating shell 4128. The base insulator 4140 is also selected to have moderate compressive strength. The preferred materials for the base insulator 4140 are ceramics such as magnesia and zirconia.

The alternate sample chamber 447 differs from the preferred sample chamber 47 in that, instead of the bottom die bore seal 82 and the second sample space 84 (illustrated in FIG. 2) the alternate sample chamber 447 includes, at its lower end, a chamber thermal insulator 4142 and, occluding the opening of the sample transfer tube 4136, a chamber breakout disc 4144.

The chamber thermal insulator 4142 serves the functions of retarding the cooling of the heated sample 11 within the alternate sample chamber 447 until the conditions are right for the transfer of the sample 11 through the sample transfer tube 4146 to the injection mold 4130. The chamber thermal insulator 4142 is selected to be a good thermal insulator, but also a reasonably good electrical conductor and to have very low reactivity with the sample 11. The preferred material for the chamber thermal insulator 4142 is a pyrolytic graphite or highly oriented graphite or a composite of both.

The chamber breakout disc 5144 is adapted to retain the sample 11 within the sample chamber 447 until the conditions are appropriate for transfer of the sample 11 through the sample flow channel 4134 to the injection mode 4130. The breakout disc 4144 is adapted to retain the sample 11 in the chamber until after the sample 11 has been heated and the pressure has been applied thereto for transfer of the sample to the injection mold 4130. The breakout disc 4144 must then be adapted to rupture to allow passage of the sample 11 while avoiding contamination of the molten sample. For these purposes it is appropriate to construct the breakout disc 4144 of either a ductile metal such as tantalum, perhaps with an embossed design to facilitate rupture without fragmentation, or it can be made of a material which is capable of dissolving within the sample 11 without degrading the final product. One method of accomplishing the latter is to construct the chamber breakout disc 4144 of the same material as the sample 11 itself.

In operation it may be seen that the alternate dynamic subassembly 442 allows heating of the sample 11 within the alternate sample chamber 447, where pressure is simultaneously applied to the sample 11 through the hydraulic press 14, until the conditions are achieved for rupture or dissolution of the breakout disc 4144. When this rupture or dissolution occurs the sample 11 will be in a fluid condition and will flow through the sample flow channel 4134 and into the mold pattern 4132 in the injection mold 4130. In this manner, samples 11, which are otherwise very difficult to cast into appropriate shapes, may be molded utilizing the alternate dynamic subassembly 442.

Figure 5:
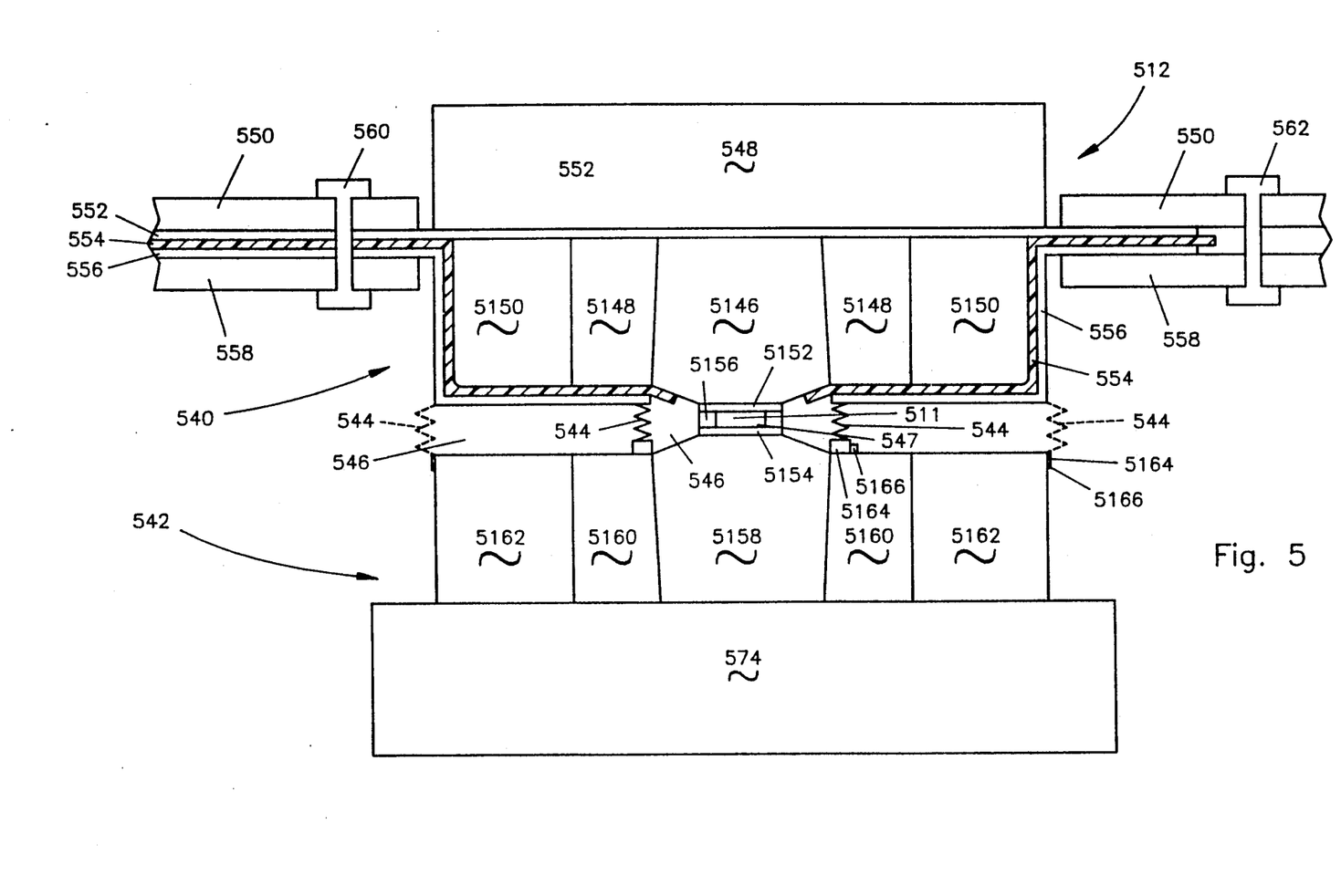
FIG. 5 is a cross-sectional view of an alternate press insert member adapted for use as a Bridgman anvil.

Referring now to FIG. 5, a cross-sectional view of an alternate embodiment of the press insert portion of the invention is illustrated. The alternate embodiment, designated by the general reference character 512, is in the nature of a Bridgman anvil which is useful for producing extremely high pressure conditions. The Bridgman anvil press insert 512 of the present invention is caused, by the novel electrical structure, to achieve extremely high temperatures under nonequilibrium conditions such that simultaneous high temperature and high pressure conditions may be achieved, a combination unavailable in prior Bridgman anvil constructions.

The designation numeral conventions utilized with respect to FIG. 5 are similar to those of FIG. 4, except that an initial digit "5" is utilized.

Similarly to the preferred press insert 12, the Bridgman anvil press insert 512 includes a static subassembly 540 and a dynamic subassembly 542. However, in the Bridgman anvil press insert 512, the construction similarity between the static subassembly 540 and the dynamic subassembly 542 is much more pronounced than it is with the preferred press insert 512.

The electric pulse supply structure of the Bridgman anvil press insert 512 is substantially similar to that of the preferred press insert That is, it includes a parallel plate transmission line structure including a first clamp plate 550, first plate conductor 552, a plate dielectric 554, a second plate conductor 556 and a second clamp plate 558, all held in position by first clamp bolt 560 and second clamp bolt 562. In the Bridgman anvil press insert 512, the plate dielectric 554 and the second plate conductor 556 extend differently from the arrangement of the press insert 12, as will be discussed hereinafter.

The radially symmetrical compression portion of the Bridgman anvil press insert 512 includes, in the static subassembly 540, a carbide static piston 5146 surrounded by a first static backup ring 5148 and a second static backup ring 5150.

The static carbide piston 5146 transmits the mechanical force between a static backing plate 548 and the sample 511 contained in the sample chamber 547. The static carbide piston 5146 is similar in structure and is preferably constructed of the same material as is the piston/center conductor 64 illustrated in FIG. 2. The static carbide piston 5146 is shaped so as to have a greater diameter at the end nearest the sample 511 than it does at the end which abuts against the first conductor plate 552. This shaping facilitates high pressure conditions.

Pressure is applied to the static carbide piston 5146 by the static first backup ring 5148 which radially surrounds it. The first static backup ring 5148 provides precompression and support for the carbide piston 5146. The preferred embodiment for the first static backup ring 5148 is a high tensile strength alloy with a thermal expansion coefficient which is not too much greater than that of the tungsten carbide material utilized for the carbide piston 5146. Therefore, the first static backup ring 5148 will not expand much more upon heating than will the carbide piston 5146, and the compressive abutment therebetween will not be degraded upon heating.

The second static backup ring 5150 radially surrounds the first static backup ring 5148. The second static backup ring 5150 provides additional compressive support for the first static backup ring 5148 and the carbide piston 5146. High tensile strength and toughness are required for the second static backup ring 5150. The preferred material is a high tensile strength alloy. The second backup ring 5150 must also have high impact strength since failure of the carbide under load can result in an explosive release of energy.

The sample chamber 547 is defined by a top sample plate 5152 which abuts against the bottom of the static carbide piston 5146, a bottom sample plate 5154 and a circumferential seal gasket 5156. The sample 511 is enclosed within the sample chamber 547. The top sample plate 5152 and the bottom sample plate 5154 function as load transmitting members, electrical conductors and heat shields for the sample chamber 547. The preferred material for the disc-shaped sample plates 5152 and 5154 is tungsten carbide. The seal gasket 5156 provides a deformable high pressure seal that also functions as an electrical insulator.

The seal gasket 5156 must be an electrical insulator/dielectric in order to force the electrical pathway 549 through the sample 11 to provide instantaneous electric pulse heating. The preferred material for the seal gasket 5146 is pyrophyllite or another ceramic which is selected to have the characteristic of becoming plastic at high pressures.

As stated, the dynamic subassembly 542 is substantially identical in construction to the static subassembly 540, except that the dynamic subassembly 542 does not include the electrical plate conduction components. The dynamic subassembly 542 includes a dynamic backing plate 574 which causes mechanical pressure to be applied to a dynamic carbide piston 5158, a dynamic first backup ring 5160 and a dynamic second backup ring 5162. The construction and materials of the dynamic carbide piston 5158, the dynamic first backup ring 5160 and the dynamic second backup ring 5162 are identical to the corresponding static components.

As is the case with the preferred press insert member 12, the Bridgman anvil press insert 512 has the static subassembly 540 and the dynamic subassembly 542 connected by bellows connector 544. The bellows connectors 544 provide a flexible portion of the electrical current pathway 549. In addition, in the Bridgman anvil press insert 512, the bellows connector 554 act as the walls of a vacuum chamber 546. It is desirable to create the vacuum chamber 546 about the sample chamber 547 in order to maintain a controlled atmosphere in the vicinity of the sample 511. For most purposes, it is desirable to evacuate the vacuum chamber 547 during the processing. The bellows connector 544 are fixedly connected to the second conductor plate 556 and are detachably connected to the dynamic subassembly 542. The detachable connection is necessary in order to allow insertion of the sample into the insert 512. The attachment is accomplished by use of a belows clamp 5164 which may be provided with an additional vacuum sealer 5166 on the exterior thereof to maintain the vacuum seal. The bellows clamp 5164 provides a firm detachable mechanical and electrical connection between the bellows connectors 544 and the dynamic subassembly 542. The vacuum sealer 5166 may be necessary if the form of bellows clamp 5164 utilized does not provide an adequate vacuum seal.

It is noted that two separate arrangement of the positioning of the bellows connectors 544 are illustrated in FIG. 5. The inner position, shown in solid, represents an arrangement in which the vacuum chamber 546 is relatively small in volume. In order to accomplish connection at the inner position, the second plate conductor 556 must extend along the surface of the static backup rings 5148 and 5150, separated therefrom, of course, by an extension of the dielectric plate 554. This extension is necessary in order to provide a return conducting pathway 549 through the bellows connector 544. It is noted that the dielectric plate 544 extends further than the second conductive plate 556. This is desirable in order to avoid any potential arcing of electrical energy through the carbide piston 5146 and back to the first conductive plate 552.

The second potential arrangement of the bellows connector 544 is illustrated in phantom in FIG. 5 and shows a larger vacuum chamber 546. The alternative arrangement of the bellows connector 544 allows for an easier connection to the vacuum pump 36 and also simplifies the structure of the conductive pathway 549. If the second arrangement is utilized the second conductive plate 556 and the dielectric plate 554 may terminate at the outside of the static second backup ring 5150. The second arrangement provides lower circuit resistance and higher inductance than the first. It is envisioned that either of the two arrangements of the bellows connector 544 may be utilized, but that both would not be utilized in the same application.

A conventional Bridgman anvil is capable of producing pressures as high as $4.1 \times 10^{10}$ pascal (6 million psi) at room temperature. In traditional operation, the sample chamber may be heated by the passage of electric current and the chamber temperature is established under what are essentially equilibrium conditions. Under such conditions, the load bearing elements are subjected to significant heating. Conventional usage prevents extremely high pressures at high temperatures. However, the preferred Bridgman anvil insert 512 permits heating of the sample 511 under essentially adiabatic, nonequilibrium, conditions. Thus, at the time of the peak temperature and peak pressure in the sample, the only temperature increase in the load bearing structure is that due to joule self heating. The amount of self heating in the sample and in the load bearing structure is function of their relative specific resistances and specific heats.

By properly selecting the pulse energy, discharge time and sample composition, melting of carbon and subsequent solidification can be achieved with the use of the Bridgman anvil press insert 512 at temperatures and pressures at which diamond is the thermodynamically favorable solid phase greater than $1.4 \times 10^{10}$ pascal (>2.1 million psi).

After the pulse discharge, the heat generated in the sample 511 will diffuse into the sample plates 5152 and 5154 and from there into the carbide pistons 5146 and 5158. Depending upon the energy dissipated in the pulse and the thermal transport characteristics, the sample plates and carbide pistons will experience a rise in temperature and a subsequent reduction in strength during which time the sample 511 will be cooling. However, by proper selection of the operating parameters, the pressure can be reduced as the load bearing structure is heated by the sample 511. In this way damage to the load bearing structure can be avoided and the resulting diamond in the sample chamber 547 can be prevented from converting to graphite. Since the conversion of diamond to graphite in a vacuum occurs at a appreciable rate only at temperatures above about 2000 K there is considerable leeway for cooling of the metastable diamond at reduced pressure.

Two primary approaches to reducing the thermal loading of the anvil structure 512 by increasing the thermal resistance 511 may be utilized, thereby reducing the joule self heating in the anvil 512. The first approach is to use a mixture of diamond power and graphite or amorphous carbon as the sample 511. Since diamond is a dielectric (or at best, a semiconductor,) the overall sample resistance to electrical conductivity will be raised. Also, for very fast pulses, the diamond phase will not be heated entirely and will there by serve as a local heat sink during solidification of the molten carbon and will result in a lowering of the peak temperature experienced in the load bearing structure. A further advantage of the first approach is that the presence of solid diamond in contact with the molten carbon offers the opportunity for heterogeneous nucleation of a metastable phase, i.e., the growth of diamond at pressures below that required for homogeneous nucleation from the melt.

The second technique is to use a highly oriented graphite such as pyrolytic graphite in the sample material 511. By orienting the graphite with the c-axis parallel to the pressing direction, the extreme anisotropy of the electrical and thermal conductivity of graphite can be used to best advantage. In this orientation, the highest electrical resistance and lowest thermal conductivity can be obtained. Even randomly oriented graphite powders acquire orientation during cold pressing. Typical electrical resistivity 0.2 ohm-cm parallel to the c-axis and 0.00018 ohm-cm normal to the c-axis.

It should be noted that due to the difference in density between graphite (2.25 g/cm$^3$) and diamond (3.5 g/cm$^3$), the hydraulic system 14 will be required to provide a displacement at pressure during cooling that will be dependent upon the volume of graphite undergoing conversion.

The above embodiments have been described in light of specific constructions and materials. However, it is understood that various dimensions, materials and constructions are possible without departing from the spirit of the invention. Accordingly, the above disclosure and accompanying drawings are not intended as limiting and the appended claims are to be interpreted as encompassing the entire scope of the invention.

INDUSTRIAL APPLICABILITY

The present invention is an electric pulsed power vacuum press structure, and, in particular, the press insert member thereof. The various embodiments of the invention are of particular utility in heating samples of various materials under high mechanical pressure conditions ordinarily in low atmosphere conditions provided by a vacuum chamber 46.

The primary preferred embodiments include the press insert member 12 illustrated in FIG. 2 which may be utilized to obtain very rapid high temperature conditions within the sample 11. In addition, the alternate Bridgman anvil press insert member 512 can achieve extremely high pressure conditions and may be useful for such applications as creating diamond. The alternate base insert assembly of FIG. 4 may be utilized to cast various materials into specific molded shapes, which materials would uncastable in prior equipment and processes.

The present invention embodies numerous advantages and improvements over the prior art and is applicable to both research and industrial applications. The volume of the sample 11 to be processed are determined entirely by the size of the equipment utilized and the temperatures achieved are limited only by the available power pulses and the limitation on the materials.

The primary improvement of the present invention over the prior art derives from the very low inductance, very low resistance press structure coupled with a pulse discharge power supply. The improved system is capable of peak sample input power densities in excess of $10^9$ watts/cm$^3$ and heating rates in excess of $10^7$ degrees C./sec. These power and heating capabilities are obtained without sacrificing pressure capacity.

For mixtures of conductive and dielectric powders, the rapid heating will allow for extreme heating, or even melting of the conductive phase with minimal heat transfer to the dielectric phase. This is of great utility when the dielectric phase is subject to undesirable attack by a lower melting point conductive phase. Rapid pulse heating allows for densification by flow of the heated conductive phase under pressure with limited surface heating of the dielectric phase. Rapid cooling is achieved since the dielectric phase acts as a local heat sink. The equilibrium temperature of the mixture is a function of the relative amounts of the two phases, their specific heats, and the energy input in the pulse. Since the press dimensions are much greater than the phase separation dimensions in the mixture, the press structure thermal loading is driven by the equilibrium mixture temperature and not the peak temperature obtained in the conductive phase.

Another example of the utility of extremely rapid heating of a conductor/dielectric mixture is the case when both materials are refractory in nature and do not melt or soften except at very high temperatures, and the conductor has a higher melting point than the dielectric. Direct heating of the conductor at a moderate to fast rate will allow for local softening or melting of the dielectric particles in contact with the conductor, with subsequent deformation under pressure to achieve densification.

When heating rates greater than or equal to $10^7$ degrees C./sec are used, the process is virtually adiabatic with respect to the sample chamber. Since there is very little heat transfer from the sample to the press structure during heating, and there is no dwell at the peak process temperature, the thermal loading of the press structure is minimized.

In processing of powder compacts by rapid heating and cooling, it is important to maintain control over the atmosphere resident in the porosity of the sample prior to pressing and heating. In processes involving slow heating and cooling and/or long dwell times, it is possible for undesirable gases or adsorbed species to diffuse out of the sample as densification proceeds. In rapid processing there is no such opportunity. Rapid heating and cooling will allow contaminants that are normally of limited solubility to be trapped in the sample. The ability to evacuate and outgas the sample prior to pressing and heating is thus important if contamination is to be avoided. The present invention offers this capability.

Additional improvements relate to the sample containment structure. These improvements allow for simple fabrication and maintenance as well as optimum pressure and temperature capability. These additional improvements are enabled by the rapid heating capability and the use of containment elements that serve as thermal capacitors.

The preferred embodiment 10 of the invention obtains optimum results that each of the elements in the conducting pathway 49 is designed for low resistance and inductance, and high rigidity and breakdown voltage. The inductance of the conducting pathway 49 as a whole is reduced and the resistance is minimized. Breakdown voltage is a function of the dielectric strength and thickness of the material separating the two elements of the transmission line. Sharp radii on the conductor surfaces are to be avoided since they produce high electric fields that reduce the assembly breakdown voltage. Thus the parallel plate structures are highly desirable.

When the complete press structure and power supply are considered as a system, the values of the resistance, inductance and capacitance could be such that natural response of the system is close to being critically damped. Since the bulk of the system resistance is in the sample, and the sample resistance will change with temperature, it is not possible to achieve critical damping. However, by operating under conditions that approximate critical damping, the maximum average power for the pulse can be obtained.

For the fastest possible heating, the peak power must be reached in the shortest possible time. Since the rise time to peak power in a critically damped circuit is directly proportional to the square root of the product of the inductance and capacitance, it is desirable to minimize both the system inductance and capacitance. In a constant energy system a decrease in the capacitance must be compensated for by an increase in the voltage and the materials of construction and the operating environment limit the voltage that can be used. However, there is no such disadvantage associated with a decrease in system inductance, only the advantage of faster rise time, thus minimum inductance is crucial to a fast high energy system.

For very fast pulses there is an opportunity for producing shock waves in the sample that will create transient pressures that are significantly greater than the statically applied pressure.

Under certain circumstances it may be desirable to have a greater power dissipation at the surface of the sample. In such a case, an underdamped circuit can be tuned provide an oscillatory response that will achieve increased surface heating due to the skin effect.

Under other circumstances in which a moderate heating rate is desired, the circuit can be overdamped to provide for an extended heating period with lower power intensity.

To summarize, in a stored energy discharge system that can be characterized as a series RLC circuit, the rate at which the energy is delivered to the load can be adjusted over a broad range by proper selection of the values for R, L and C. If fast response and large energy storage is to be achieved, the system inductance and resistance must be minimized.

In light of the above illustrated advantages and object of the invention and the preferred embodiments as illustrated in the several figures of the drawings, it may be seen that the present invention has a variety of uses. Accordingly, it is expected that the industrial utility of the present invention will be both widespread in nature and long lasting in duration.

I claim:

1. An electric pulsed power press assembly comprising:
    (a) a static subassembly including a parallel plate transmission line structure for reducing circuit inductance and resistance, said parallel plate transmission line structure including: a first plate conductor means, a second plate conductor means, a dielectric means situated between said first plate conductor and said second plate conductor for preventing the direct flow of electric current between said first plate conductor and said second plate conductor, and a securing means for restricting relative motion between said first plate conductor and said second plate conductor; and
    (b) a dynamic subassembly including: a sample chamber means for containing an electrically conductive material, a means for transmitting mechanical force to said material, and a current return pathway means for conducting electric current from said material to said second plate conductor; and
    (c) a means for transmitting mechanical force from said static subassembly to said material; and
    (d) a means for conducting electric current from said first plate conductor to said material; and
    (e) a press means for applying a mechanical force to said static subassembly and an opposing force to said dynamic subassembly; and
    (f) a bipolar power supply means for delivering electric current to said press insert member; wherein
    (g) one pole of said power supply means is electrically connected to said first plate conductor; and
    (h) the second pole of said power supply means is electrically connected to said second plate conductor.

2. The assembly of claim 1 further including a vacuum means for evacuating a volume including said material.

3. The assembly of claim 1 wherein the dynamic subassembly includes an injection mold means adjacent to, and connected to the sample chamber by a sample flow channel means for transferring the sample material to the injection mold.

4. The assembly of claim 1 wherein said means for transmitting mechanical force from said static subassembly to said material includes a member comprising an alloy of tungsten carbide and cobalt; and, said connective means for conducting electric current from said first plate conductor to said material includes a member comprising an alloy containing tungsten carbide and cobalt.

5. The assembly of claim 1 wherein said means for conducting electric current from said first plate conductor to said material includes a member that is also included in said means for transmitting mechanical force form said static subassembly to said sample material.

6. An electric pulsed power press assembly comprising:
    (a) coaxial transmission line assembly comprising: a piston/center conductor means for transmitting both electric current and mechanical force to an electrically conductive material, a sample chamber means for containing said material, a second conductor means for transmitting both electric current and mechanical force from said material, a coaxial conductor means for conducting current from said second conductor means, said coaxial conductor means substantially surrounding said piston/center conductor means, and a coaxial dielectric means situated between said first conductor means and said coaxial conductor means for electrically isolating said first conductor means from said coaxial conductor means; wherein
    (b) a series electric circuit is established between said piston/center conductors means, said material, said second conductive means, and said coaxial conductor; and
    (c) a press means for applying a mechanical force to said piston/center conductor and an opposing force to said second conductor means; and (d) a bipolar power supply means for supplying electric current to said coaxial transmission line assembly; wherein (e) one pole of said power supply means is electrically connected to said piston/center conductor; and (f) the second pole of said power supply means is electrically connected to said coaxial conductor.

7. The assembly of claim 6 further including a vacuum means for evacuating a volume including said material.

8. The assembly of claim 6 wherein the dynamic subassembly includes an injection mold means adjacent to, and connected to the sample chamber by a sample flow channel means for transferring the sample material to the injection mold.

9. The assembly of claim 6 wherein said piston/center conductor comprises an alloy containing tungsten carbide and cobalt.

10. The assembly of claim 7 wherein said coaxial conductor is a flexible bellows that is included in said vacuum means.

* * * * *